Patented June 10, 1930

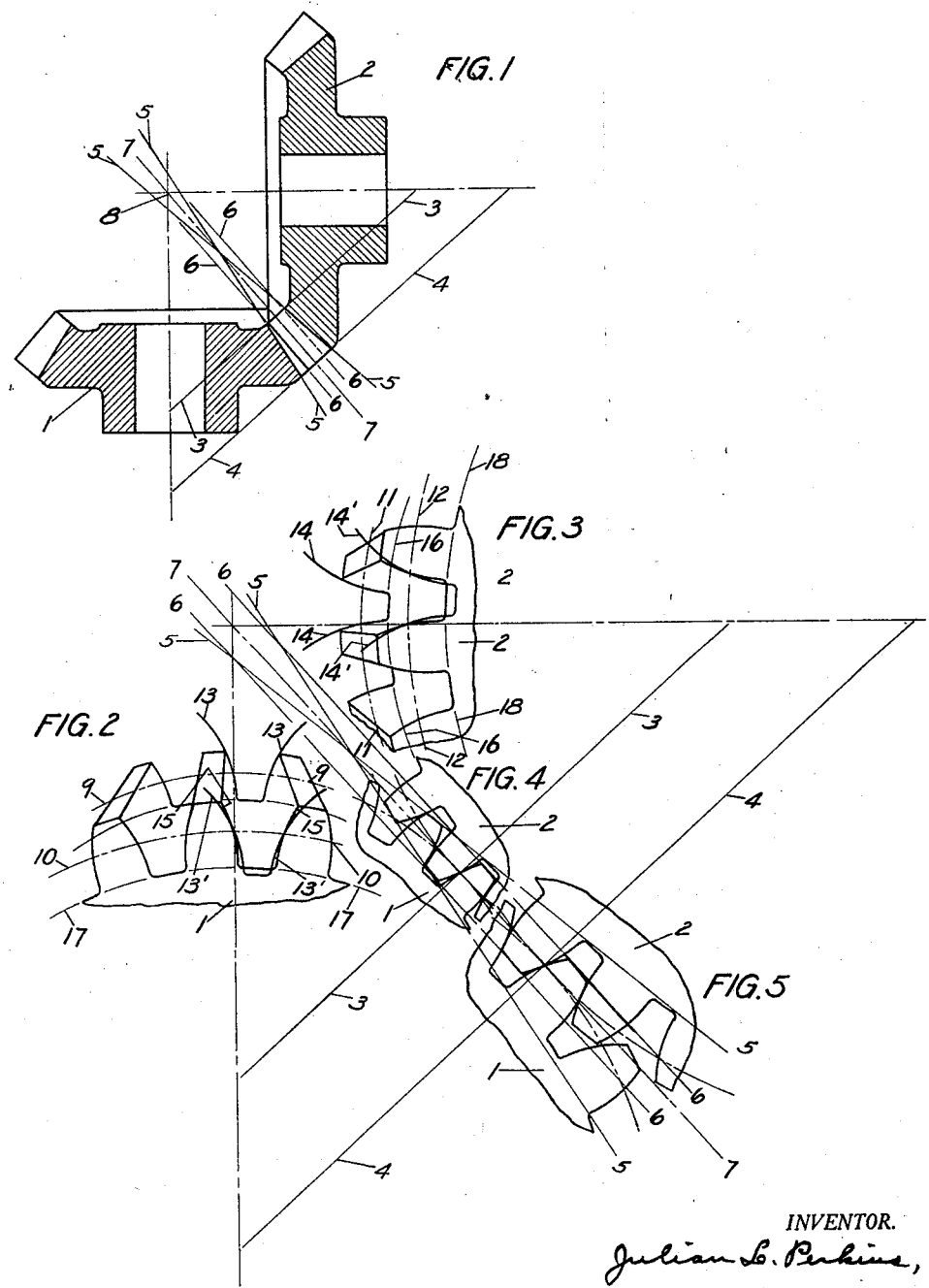

1,763,177

UNITED STATES PATENT OFFICE

JULIAN L. PERKINS, OF WEST SPRINGFIELD, MASSACHUSETTS, ASSIGNOR TO PERKINS MACHINE & GEAR COMPANY, OF WEST SPRINGFIELD, MASSACHUSETTS, A CORPORATION OF MASSACHUSETTS

METHOD OF LAYING OUT GEARS

Application filed March 12, 1929. Serial No. 346,325.

My invention relates to improvements in methods of laying out bevel gears to be cut with single-cut tools, such as those of the broaching, milling, or grinding type; and the primary object of said invention is to enable bevel gears to be produced by the single-cut process, which gears very closely approximate those having true generated teeth, whereby is effected great economy in time, labor, and expense.

This method of laying out a bevel gear is simple, and can be put into practice without the exercise of a great amount of skill beyond that incident to initially laying out the generated tooth as the first or preliminary step in my method.

Although there are various methods of and means for cutting bevel gears having true generated teeth, the process is always more or less involved and entails large expense, and efforts have been made from time to time, with greater or less success, to obtain bevel gears the teeth of which so closely approximate generated teeth as to render such gears useful for a great many purposes. With my method I obtain results which are dependable and uniformly satisfactory, and bevel gears that have a very high degree of efficiency.

Other objects and advantages will appear in the course of the following description.

I attain the objects and secure the advantages of my invention in the manner described in detail below.

The accompanying drawings, in which like reference characters designate like parts throughout the several views, are supplied to aid in the understanding of the method, and in said drawings—

Figure 1 is a section through two intermeshing bevel gears which are concrete examples of the result of my method applied in the laying out of the same, one of said gears being smaller than the other and therefore termed a pinion; Fig. 2, a diagrammatical view of a section of the pinion illustrating the method of laying out the teeth of the same; Fig. 3, a diagrammatical view of a section of the grear illustrating the method of laying out the teeth thereof; Fig. 4, a diagrammatical view of the intermeshing sections of said gear and pinion at the inner, front, or toe ends of the teeth, showing how said teeth, when laid out according to the new method, appear, and, Fig. 5, a view similar to Fig. 4, but taken at the outer, back, or heel ends of said teeth.

In the drawings the pinion is indicated by the numeral 1, and the gear by the numeral 2. These are merely suggestive of any pair of bevel gears, or of any associated bevel gear and bevel pinion, it being understood that the method is applicable to bevel gears and pinions of any size or sizes, and having any numbers of teeth.

In the first view, the inside back-angle line is represented at 3—3, the outside back-angle line at 4—4, the cutting-angle line at 5—5, the face-angle at 6—6, and the cone-angle line at 7—7. The cone-angle line 7 is common to both the pinion 1 and the gear 2, while each tooth of each of these members has a cutting-angle line 5, and a face-angle line 6, and they do not pass through the cone apex, indicated at 8, of said members, but those of the pinion and those of the gear cross and pass on opposite sides of said apex. The pinion cutting-angle and face-angle lines and the gear cutting-angle and face-angle lines also cross the cone-angle line 7. Naturally there are or may be cases where the face angles of the gear and pinion, either or both, are other than those herein shown.

In Figs. 2 and 3, the theoretical generated tooth lines extend beyond the reconstructed tooth lines, for single-cut teeth which are the objective of the new lay-out.

The pitch circles at the toe and heel ends of the pinion teeth are respectively represented at 9—9 and 10—10, in Fig. 2, and the pitch circles at the toe and heel ends of the gear teeth are respectively represented at 11—11 and 12—12 in Fig. 3.

Although the width of a tooth and the width of a space between two adjacent teeth on any pitch circle are usually the same or equal, there are, of course, cases where such is not the case. The lay-out is applied to the tooth spaces.

At 13—13 are represented curves which form the outline at the toe end of a theoretically perfect, generated tooth slot, and at 13'—13' are represented curves which form the outline at the heel end of said slot, in the pinion 1, Fig. 2. Similarly, in Fig. 3, the curves, at the toe end of a theoretically perfect, generated tooth slot in the gear 2, are represented at 14—14, and the curves at the heel end of said slot are represented at 14'—14'.

As the first step in the method, the theoretically perfect, generated outlines at the toe and heel ends of a tooth or of a tooth slot in the bevel gear or pinion to be cut, with a single-cut tool, are laid out in the usual manner, or according to the customary rules, as at 13 and 13', respectively, for the pinion 1, and at 14 and 14', respectively for the gear 2, although the outline at the heel end need not necessarily extend inwardly beyond the pitch circle 10. The outlines 13 and 13' and 14 and 14' here are involute curves, but such outlines might be cycloidal or other curves, or approximations of any or all of the same. The full depth of the tooth slot at the toe end includes the distance from points on the pitch circle 9 through which the involute curves 13 pass to the total-depth circle represented at 15—15 in the case of the pinion. Similarly the total depth of the tooth slot at the toe end in the gear includes the distance from points on the pitch circle 11 through which the involute curves 14 pass to the total-depth circle represented at 16—16 in Fig. 3. This full or total depth in each case is the same for both the generated and approximated conditions, and said total depth is instrumental in determining the cutting angle of the single-cut tooth, which angle is found by a line connecting the total depth of the tooth slot at the toe end with the low point or total depth of said slot at the heel end—see 5—5—Fig. 1.

Now it is necessary to determine the form of the tooth of the pinion, or of the gear, at the heel end. To do this take the form or outline of the slot at the toe end, apply said outline at the heel end, and move it inwardly or toward the axial center of the pinion, or gear, until the chordal width of said outline which equals the normal chordal width of the slot at the heel end, or on line 4—4, is located with the ends on the pitch circle 10, or the pitch circle 12. The total-depth circle at the heel end of the pinion tooth is represented at 17—17, and such circle at the heel end of the gear tooth is represented at 18—18.

A line or plane extending between the total-depth circles at the toe and heel of any tooth slot determines the cutting angle. As a rule this cutting angle is different from the accepted cutting angle of the generated tooth condition, and it is usually necessary in cutting to tip either the blank or the cutting tool, or both, more than under normal or generating conditions, although there might be cases where the tipping of either or both members would be less than under generating conditions.

In cutting any bevel gear in accordance with my lay-out therefore, the cutting portion of the tool is shaped in cross section to conform to the shape of the tooth slot at the toe end in the lay-out, and said tool and the blank to be cut are set relatively so that the tool conforms to the cutting angle. Due to this formation and the angular positioning of the tool, said tool cuts and sinks deeper at the heel end than it does at the toe end of the slot. This is necessary because the width of the space at the heel end of the generated slot is greater (wider) than that of the space at the toe end of said slot, and the tool must cut through with exactness between the points on the pitch circle which represent the width thereon of the space between the teeth at the heel end, as well as through between the points on the pitch circle which represent the width thereon of the space between the teeth at the toe end.

The face angle 6—6 of the tooth is determined by a line drawn from the high point on the outside diameter of the toe to the high point on the outside diameter of the heel.

Although I have described above the usual and generally preferred manner of practicing my method, it is conceivable that some departure in matters of detail, in addition to those hereinbefore alluded to, necessary because of some special or unusual condition or conditions, may be made without departing from the spirit of the invention, or exceeding the scope of what is claimed.

I claim:

1. In a method of laying out single-cut bevel-gears, the steps of generating the outline of a developed tooth slot at the toe end and the outline thereof at the heel end as far inwardly at least as the pitch circle at that end, maintaining the total-depth circle at the toe end, finding a total-depth circle at the heel end by applying the outline of said slot at the toe end to the heel end in a manner to cause opposite sides of said outline to coincide with the points on the pitch circle at the heel end through which the developed curves pass or to which they extend, and connecting by a line the total-depth circle thus obtained at the heel end with the total-depth circle at the toe end to determine the cutting angle.

2. A single-cut bevel gear each tooth of which is normal with the generated tooth on the pitch circles at the toe and heel ends, and has a generated outline at the toe end, and an outline at the heel end the dedendum of which is similar to the dedendum plus of the outline at the toe end, but, being normal on the pitch line at that end, extends deeper into the body of the gear than would a generated form, with the result that the cutting angle of the single-cut tooth is angular to the cutting angle of the generated tooth.

3. A method of laying out single-cut bevel gears consisting in laying down the pitch circles at the toe and heel ends, and the total-depth circle at the toe end, of a developed tooth slot, in outlining such slot at the toe end, including that portion which is between the points on the pitch circle through which the developed curves pass to the total depth circle at that end, and in applying the outline thus obtained to the heel end in a manner to cause two oppositely disposed points in the sides of said outline to coincide with the points on the pitch circle at the heel end through which the normally developed curves would pass.

4. The method of laying out single-cut bevel gears consisting in establishing pitch circles and determining the outline of a developed tooth slot at the toe end and the outline of at least the portion of said slot above or outside of the pitch circle at the heel end, and establishing the total depth circle at the toe end, and in applying the outline of the tooth slot at the toe end to the heel end in a manner to cause the sides of the same to coincide at two oppositely disposed points with the points on the pitch circle at the heel end through which the normally developed curves would pass.

5. A method of laying out single-cut bevel gears consisting in finding the outline of the tooth slot at the toe end, and the chordal width on the pitch line at the heel end of said slot, and in applying said outline at said heel end, with the ends of the chord of said width just touching said outline at opposite points.

JULIAN L. PERKINS.